United States Patent
Howell et al.

(10) Patent No.: US 7,904,094 B2
(45) Date of Patent: Mar. 8, 2011

(54) METHOD FOR REDUCING WIRELESS COMMUNICATION PROCEDURE FAILURE

(75) Inventors: Stephen A. Howell, Glouscester (GB); Prashanti Das, Bangalaore (IN); Srikishna Maloor Ramachandra, Bangalore (IN)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 10/974,625

(22) Filed: Oct. 27, 2004

(65) Prior Publication Data

US 2006/0089137 A1   Apr. 27, 2006

(51) Int. Cl.
*H04W 74/00* (2009.01)
*H04W 36/00* (2009.01)
*H04W 4/00* (2009.01)
*H04L 12/66* (2006.01)

(52) U.S. Cl. ......... 455/455; 455/436; 370/331; 370/352

(58) Field of Classification Search .......... 455/434, 455/450, 418–420, 435.1–435.3, 455, 436–443, 455/451, 452.1, 452.2; 370/331, 352–356
See application file for complete search history.

(56) References Cited

U.S. PATENT DOCUMENTS

| | | | | |
|---|---|---|---|---|
| 5,208,806 A * | 5/1993 | Hasegawa | | 370/352 |
| 6,061,559 A * | 5/2000 | Eriksson et al. | | 455/435.3 |
| 6,477,373 B1 * | 11/2002 | Rappaport et al. | | 455/436 |
| 6,725,044 B2 * | 4/2004 | Verma et al. | | 455/444 |
| 7,103,363 B2 * | 9/2006 | Einola et al. | | 455/450 |
| 7,231,213 B2 * | 6/2007 | Dorsey et al. | | 455/445 |
| 7,359,347 B2 * | 4/2008 | Ahmavaara et al. | | 370/328 |
| 2002/0123348 A1 * | 9/2002 | Willars et al. | | 455/436 |
| 2003/0119520 A1 | 6/2003 | Yoshioka et al. | | |
| 2004/0224669 A1 * | 11/2004 | Pedlar et al. | | 455/412.1 |
| 2004/0224686 A1 * | 11/2004 | Pedlar | | 455/435.1 |
| 2005/0009518 A1 * | 1/2005 | Einola et al. | | 455/432.2 |
| 2006/0035642 A1 * | 2/2006 | Farnsworth et al. | | 455/450 |
| 2006/0063544 A1 * | 3/2006 | Zhao et al. | | 455/510 |
| 2006/0209675 A1 * | 9/2006 | Jacobson | | 370/216 |

FOREIGN PATENT DOCUMENTS

| | | |
|---|---|---|
| EP | 1 124 395 A1 | 8/2001 |
| EP | 1 441 555 A1 | 7/2004 |
| WO | WO 02/01903 A1 | 1/2002 |

OTHER PUBLICATIONS

"Universal Mobile Telecommunications System (UMTS); RRC Protocol Specification (3G TS 25.221 version 3.1.0 Release 1999)", ETSI TS 125331 V3.1.0 (Jan. 2000) Technical Specification, 282 pages.

\* cited by examiner

*Primary Examiner* — George Eng
*Assistant Examiner* — Nam Huynh
(74) *Attorney, Agent, or Firm* — Gary J. Cunningham

(57) ABSTRACT

A method for reducing wireless communication procedure failure. The method can include initiating a procedure over an existing radio resource control connection on a universal mobile telecommunication system. The method can also include receiving a connection release signal prior to receiving a response from a core network regarding the initiated procedure. The method can further include immediately retrying the procedure.

11 Claims, 5 Drawing Sheets

METHOD FOR REDUCING WIRELESS COMMUNICATION PROCEDURE FAILURE

BACKGROUND

1. Field

The present disclosure is directed to a method for reducing wireless communication procedure failure. More particularly, the present disclosure is directed to reducing wireless communication procedure failure on a universal mobile telecommunications system.

2. Description of Related Art

Presently, wireless communication devices, such as mobile communication devices can be used to engage in wireless communications. To participate in a communication procedure, the wireless communication device can establish a connection for different domains, such as circuit switched domains or packet switched domains. Unfortunately, a first procedure may be finishing on one domain when a second procedure is being initiated on another domain. This can result in the wireless communication device receiving a release signal for the connection regarding the first procedure after the second procedure has initiated, but before the second procedure has completed. The wireless communication device will then view the release signal regarding the first procedure as a call failure regarding the second procedure.

For example, a packet switched call may be completing and the network may be in the process of releasing the packet switched signaling connection along with the associated radio resource control connection with a wireless communication device. While this is happening, the wireless communication device may initiate a circuit switched call by sending a service request to the network. Unfortunately, the wireless communication device may receive a radio resource control connection release signal regarding the packet switched signaling connection and the wireless communication device may perceive this signal as a call failure regarding the circuit switched call. Similar problems can occur with radio resource control connection release collisions and location update signaling, packet switched attach signaling, packet switched detach signaling, packet switched routing area update signaling, packet switched service request signaling, routing area update signaling, and other signaling that may encounter problems or collisions with connection release signaling. These problems can lead to significant delays in establishing a connection, can lead to delays in updating a wireless communication device location, can result in the wireless communication device not being pagable during the delay, can lead to a wireless communication device user not receiving calls, and can lead to other difficulties.

SUMMARY

The disclosure provides a method for reducing wireless communication procedure failure. The method can include initiating a procedure over an existing radio resource control connection on a universal mobile telecommunication system. The method can also include receiving a connection release signal prior to receiving a response from a core network regarding the initiated procedure. The method can further include immediately retrying the procedure.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
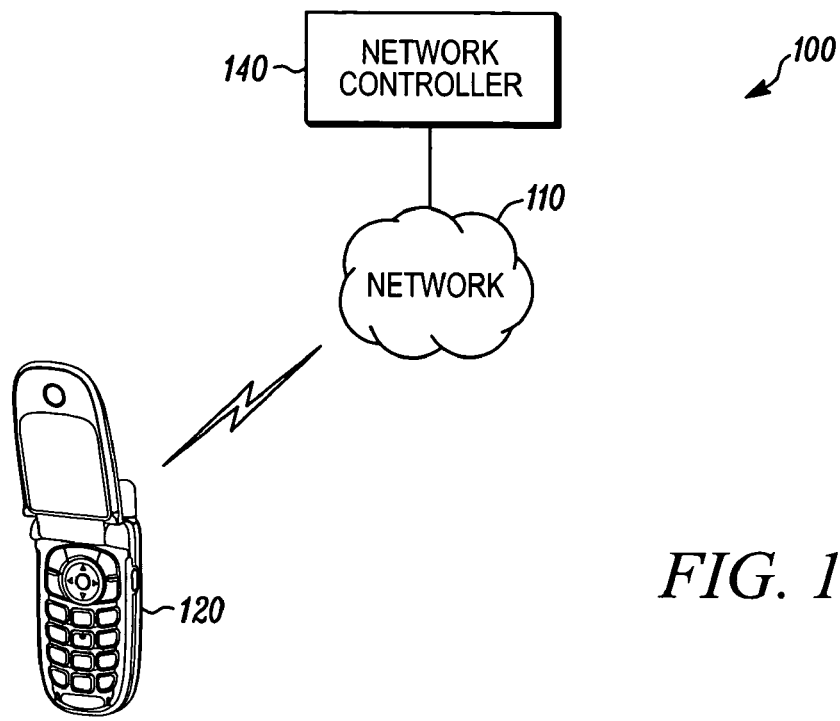
FIG. 1 is an exemplary block diagram of a system according to one embodiment.

FIG. 1 is an exemplary block diagram of a system 100 according to one embodiment. The system 100 can include a network controller 140, a network 110, and at least one wireless communication device 120. The wireless communication device 120 may be a wireless telephone, a cellular telephone, a personal digital assistant, a pager, a personal computer, a mobile communication device, or any other device that is capable of sending and receiving wireless communication signals on a network including wireless network.

In an exemplary embodiment, the network controller 140 is connected to the network 110. The controller 140 may be located at a base station, a radio network controller, a mobile switching center, a universal mobile telecommunication system terrestrial radio access network, a serving general packet radio service support node, or anywhere else on the network 110. The controller 140 can control operations on the network. The network 110 may include any type of network that is capable of sending and receiving signals, such as wireless signals. For example, the network 110 may include a wireless telecommunications network, a universal mobile telecommunications system network, a cellular telephone network, a satellite communications network, a packet switched network, a circuit switched network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

Figure 2:
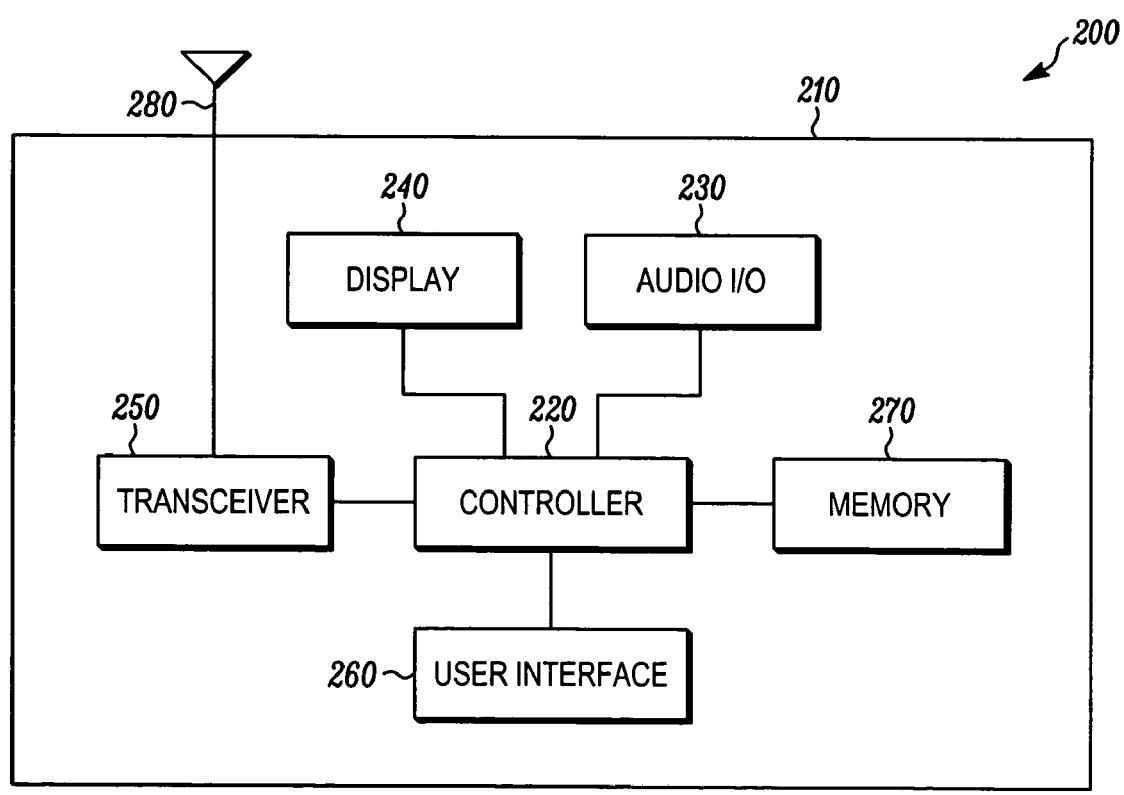
FIG. 2 is an exemplary block diagram of a wireless communication device according to one embodiment.

FIG. 2 is an exemplary block diagram of a wireless communication device 200, such as the wireless communication device 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and a electronic device. The memory 270 may include a random access memory, a read only memory, an optical memory, a subscriber identity module memory, or any other memory that can be coupled to a mobile communication device.

Figure 3:
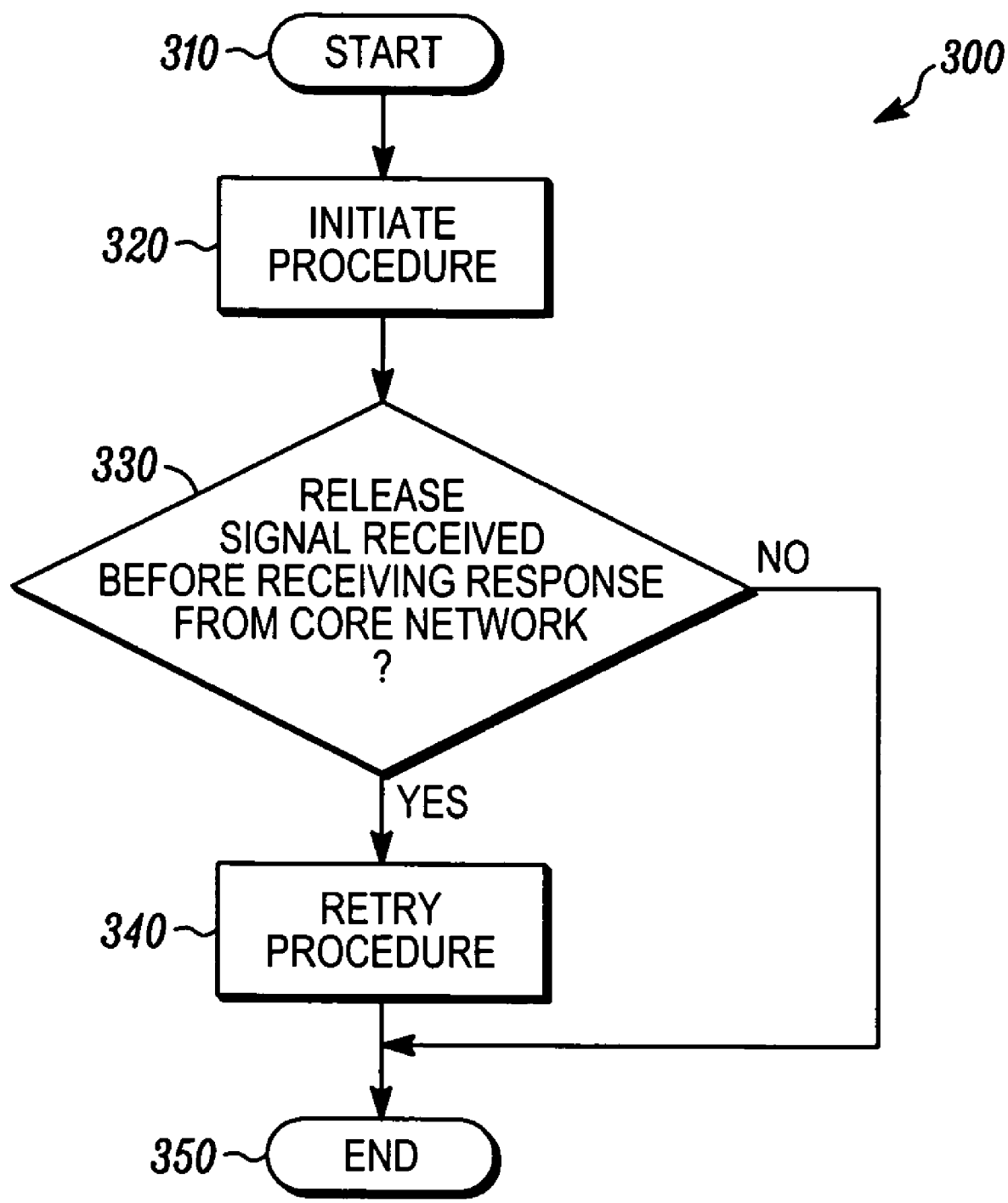
FIG. 3 is an exemplary flowchart illustrating the operation of a wireless communication device according to one embodiment.

FIG. 3 is an exemplary flowchart 300 illustrating the operation of the wireless communication device 200 according to one embodiment. This flowchart 300 illustrates one example of how wireless communication procedure failures can be reduced. In step 310, the flowchart begins. In step 320, the wireless communication device 200 can initiate a procedure over an existing radio resource control connection on a universal mobile telecommunication system. In step 330, the wireless communication device 200 can determine if a connection release signal was received prior to receiving a response from a core network. If a connection release signal was received prior to receiving a response from a core network, in step 330, the wireless communication device 200 can retry the procedure substantially immediately. The wireless communication device 200 can retry the procedure substantially immediately without designating the initiation of the procedure as a failure. The wireless communication device 200 can also retry the procedure substantially immediately without aborting the procedure. The wireless communication device 200 can additionally retry the procedure substantially immediately without waiting a designated wait period. The wireless communication device 200 can further retry the procedure by performing cell selection after receiving the connection release signal. The wireless communication device 200 can then send a radio resource control connection request after performing cell selection. The procedure can be initiated in step 320 by sending a request to a universal mobile telecommunication system terrestrial radio access network. The procedure can also be initiated in step 320 by initiating a circuit switched signaling connection initiation procedure over an existing radio resource control connection on a universal mobile telecommunication system. Then, in step 320, a radio resource control connection release signal may be received prior to receiving a response from a circuit switched core network. The procedure can be initiated in step 320 by initiating a general packet radio service mobility management procedure over an existing radio resource control connection on a universal mobile telecommunication system. Then, in step 320, the radio resource control connection release signal may be received prior to receiving a response from a packet switched core network. The procedure can be initiated in step 320 by initiating a general packet radio service mobility management procedure over an existing packet switched connection on a universal mobile telecommunication system. Then, in step 320, a radio resource control connection release signal may be received prior to receiving a response from a packet switched core network. Alternately, a packet switched connection release may be received signal prior to receiving a response from a packet switched core network regarding the general packet radio service mobility management procedure. In step 350, the flowchart 300 ends.

Figure 4:
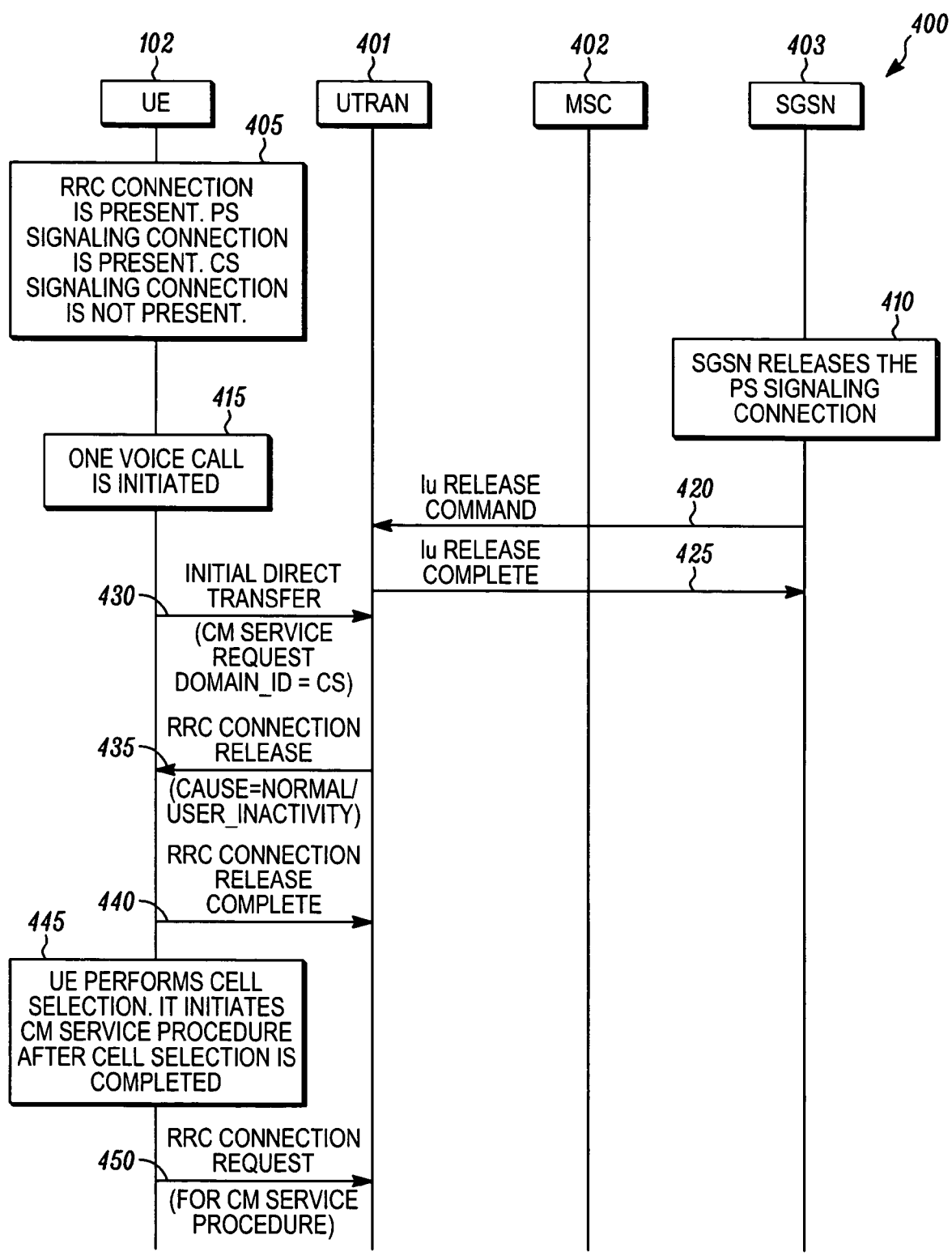
FIG. 4 is an exemplary signal diagram illustrating the signals on the system according to one embodiment.

FIG. 4 is an exemplary signal diagram 400 illustrating the signals on the system 100 according to one embodiment. The network 110 of the system 100 can include a universal mobile telecommunication system terrestrial radio access network (UTRAN) 401, a mobile switching center (MSC) 402, and a serving general packet radio service support node (SGSN) 403. The signal diagram 400 can illustrate a radio resource connection (RRC) release during a wireless communication device originated circuit switched (CS) call. At step 405, the wireless communication device 120 has a RRC connection present, has a packet switched (PS) signaling connection present, and does not have a circuit switched (CS) signaling connection present. In step 410, the SGSN 403 can release the packet switched (PS) signaling connection. In step 415, the wireless communication device 120 can initiate a voice call. In step 420, the SGSN 403 can send a release command signal to the UTRAN 401. In step 425, the UTRAN 401 can send a release complete signal to the SGSN 403. In step 430, the wireless communication device 120 can send a connection management service request signal to the UTRAN 401 to initial direct transfer. In step 435, the UTRAN 401 can send a RRC connection release signal to the wireless communication device 120. In step 440, the wireless communication device 120 can send a RRC connection release complete signal to the UTRAN 401. In step 445, the wireless communication device 120 can perform cell selection and then initiate a connection management service procedure after the cell selection is completed. In step 450, the wireless communication device 120 can send a RRC connection request to the UTRAN 401 for a connection management service procedure.

Thus, the signal diagram 400 can illustrate a scenario where a RRC connection is present and a CS signaling connection is not present. A user of the wireless communication device 120 can initiate a CS call after elements of the network 110 have started a RRC connection release procedure. The wireless communication device 120 can start the connection management service request procedure and then receive a RRC connection release during the connection management service procedure. The wireless communication device 120 can retry the connection management service procedure substantially immediately without alerting the user of a lower layer failure during the connection management service procedure.

For example, the wireless communication device 120 can receive a RRC connection release with a cause, such as normal release, user inactivity release, directed signaling connection reestablishment release, or the like, before completion of a connection establishment procedure. This can result in a substantially immediate retry of the connection establishment procedure. This can also be based on conditions such as if the connection establishment was initiated over an existing RRC connection and a new CS signaling connection, if no non-access stratum (NAS) message on the CS signaling connection was received after CM service request was sent out, and/or if a CS security procedure was not initiated after CM service request was sent out.

Figure 5:
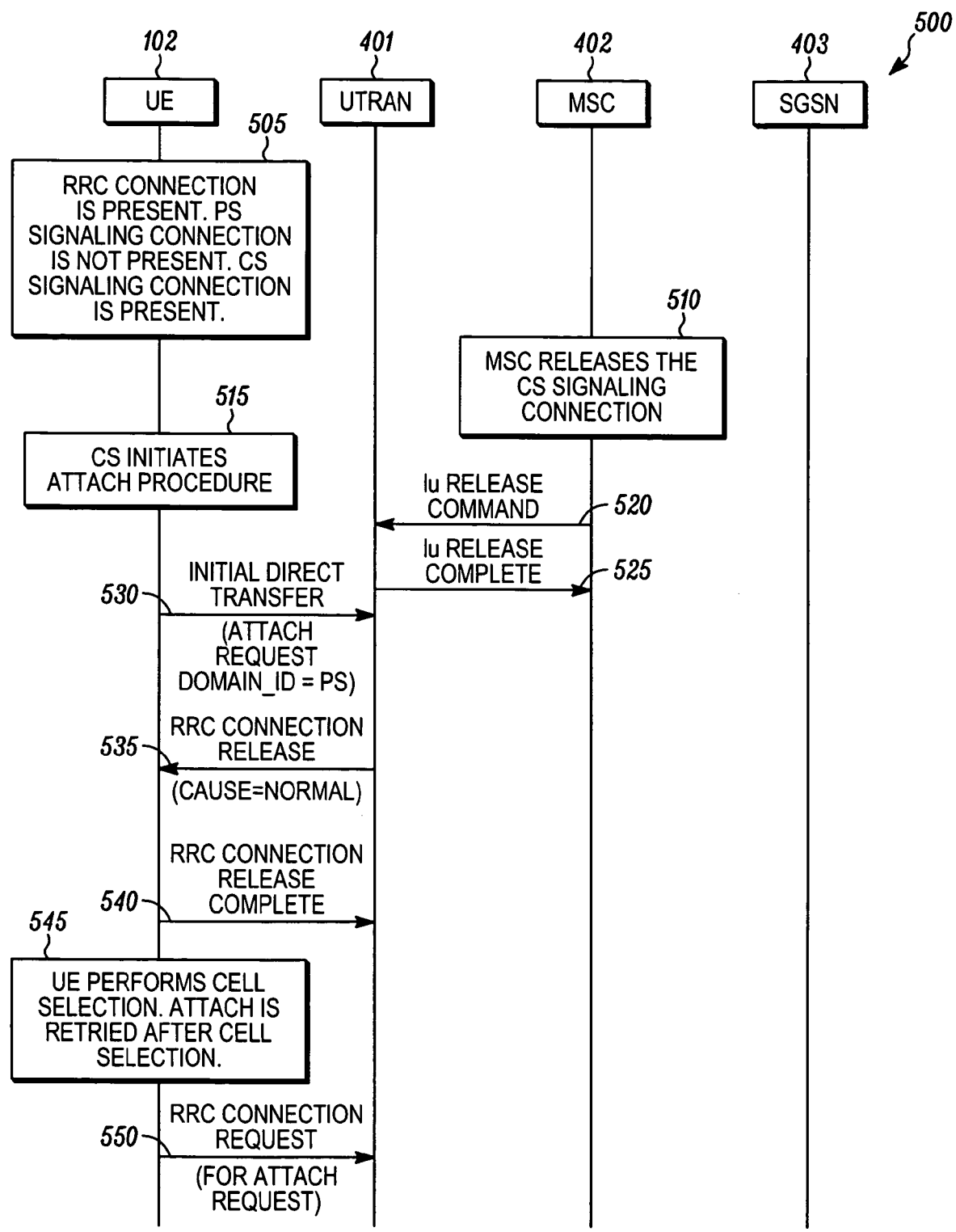
FIG. 5 is an exemplary signal diagram illustrating the signals on the system according to another embodiment.

FIG. 5 is an exemplary signal diagram 500 illustrating the signals on the system 100 according to another embodiment. In step 505, the wireless communication device 120 has a RRC connection present, has a CS signaling connection present, and does not have a PS signaling connection present. In step 510, the MSC 402 can release the CS signaling connection. In step 515, the wireless communication device 120 can initiate an attach procedure. In step 520, the MSC 402 can send a release command signal to the UTRAN 401. In step 525, the UTRAN 401 can send a release complete signal to the MSC 402. In step 530, the wireless communication device 120 can send an attach request signal to the UTRAN 401 to initial direct transfer. In step 535, the UTRAN 401 can send a RRC connection release signal to the wireless communication device 120. In step 540, the wireless communication device 120 can send a RRC connection release complete signal to the UTRAN 401. In step 545, the wireless communication device 120 can perform cell selection and immediately retry the attach procedure after cell selection. In step 550, the wireless communication device 120 can send a RRC connection request signal to the UTRAN 401 to retry the attach request procedure.

Thus, the signal diagram 500 can illustrate a scenario where a RRC connection is present and a PS signaling connection is not present when there is a RRC connection release during a general packet radio service mobility management (GMM) procedure. The wireless communication device 120 can initiate a general packet radio service (GPRS) attach procedure after the elements of the network 110 start a RRC connection release procedure. The wireless communication device 120 can receive then the RRC connection release during the attach procedure. The wireless communication device 120 can then retry the attach procedure substantially immediately.

This is analogous to a scenario where a RRC connection is present and a PS signaling connection is also present when there is a RRC connection release during a GMM procedure. The wireless communication device 120 can initiate a GPRS attach procedure after the elements of the network 110 start releasing a PS signaling connection. The wireless communication device 120 can then receive the RRC connection release or a PS signaling connection release during the attach procedure. The wireless communication device 120 can then retry the attach procedure substantially immediately.

For example, when an attach procedure is initiated due to a routing area update reject with a cause of 'Implicitly detached' or a network initiated detach with a type of 'Reattach-not-required', then wireless communication device 120 can immediately initiate the attach procedure. The network 110 may release the PS signaling connection and/or the RRC connection immediately after sending a routing area update reject or after receipt of a detach accept signal. The wireless communication device 120 can then retry the attach procedure substantially immediately or immediately.

As another example, when there is a possibility of a lower layer failure before an attach accept or an attach reject message is received, it is not necessary to abort the procedure. In one case, when there is a UMTS release of a PS signaling connection before completion of an attach procedure, the attach procedure can be retried when the attach was initiated over an existing PS signaling connection, when the attach was not due to a T3310 timer expiry, when no NAS message on the PS signaling connection was received after the attach request was sent out, and/or when a PS security procedure was not initiated after the attach request was sent out. In another case, when there is a UMTS RRC connection release with cause 'Normal' or 'User inactivity' before completion of an attach procedure, the attach procedure can retried when the attach was initiated over an existing RRC connection, when the attach was not due to a T3310 timer expiry, when no NAS messages on a PS signaling connection were received after the attach request was sent out, and/or when a PS security procedure was not initiated after the attach request was sent out. Without the above examples, a communication device may consider RRC connection release or PS signaling connection release as a lower layer failure which may result in delayed packet calls.

Figure 6:
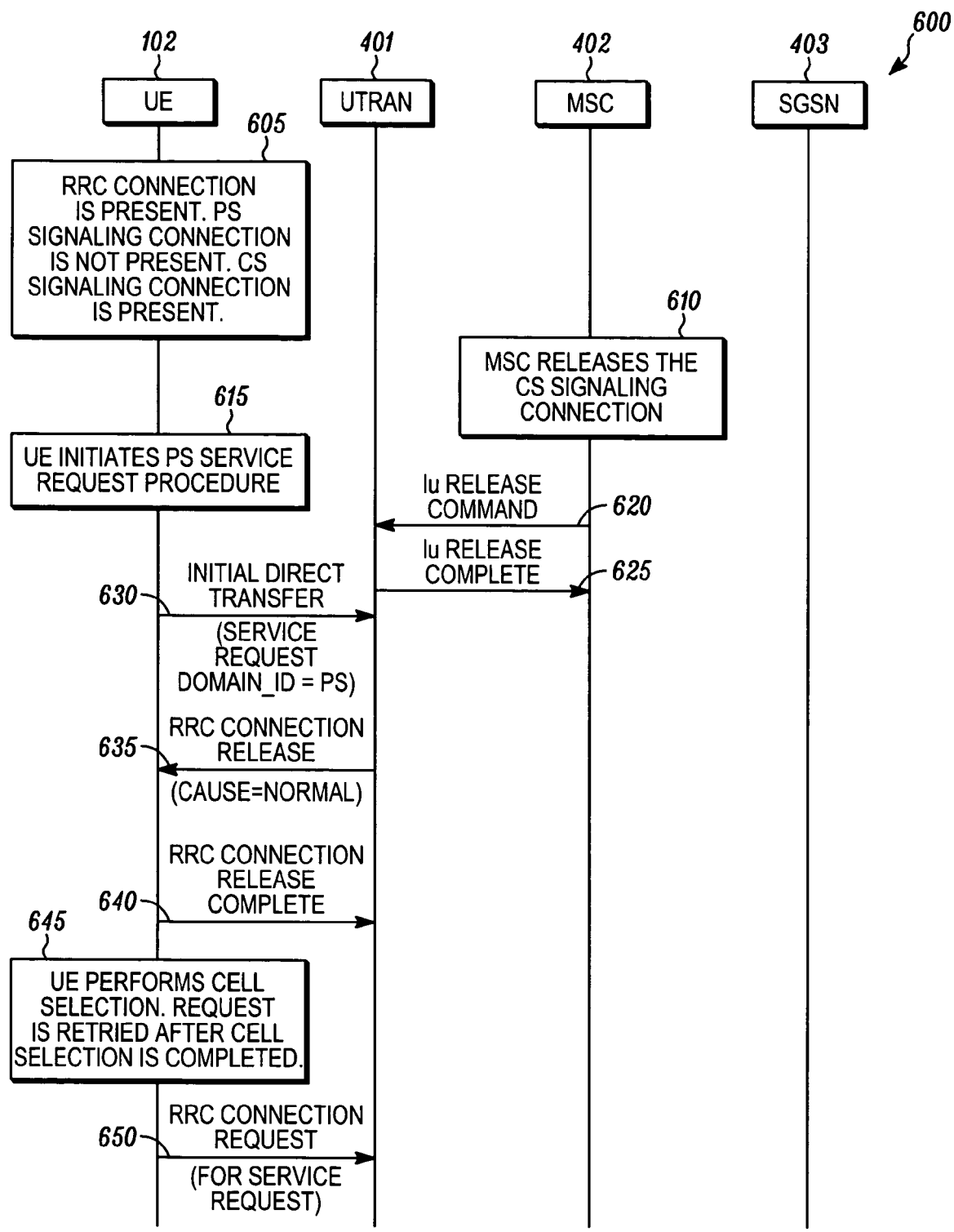
FIG. 6 is an exemplary signal diagram illustrating the signals on the system according to another embodiment.

FIG. 6 is an exemplary signal diagram 600 illustrating the signals on the system 100 according to another embodiment. The signal diagram 600 can illustrate a RRC connection release during a service request procedure. In step 605, the wireless communication device 120 has a RRC connection present, has a CS signaling connection present, and does not have a PS signaling connection present. In step 610, the MSC 402 can release the CS signaling connection. In step 615, the wireless communication device 120 can initiate a PS service request procedure. In step 620, the MSC 402 can send a release command signal to the UTRAN 401. In step 625, the UTRAN 401 can send a release complete signal to the MSC 402. In step 630, the wireless communication device 120 can send an service request signal to the UTRAN 401 to initial direct transfer. In step 635, the UTRAN 401 can send a RRC connection release signal to the wireless communication device 120. In step 640, the wireless communication device 120 can send a RRC connection release complete signal to the UTRAN 401. In step 645, the wireless communication device 120 can perform cell selection and immediately retry the service request procedure after cell selection. Of note, according to other embodiments, cell selection is not necessarily performed before retrying a procedure. In step 650, the wireless communication device 120 can send a RRC connection request signal to the UTRAN 401 to retry the service request procedure.

Thus, the signal diagram 600 can illustrate a scenario where a RRC connection is present, a PS signaling connection is not present, and the wireless communication device 120 is in a GMM registered state when there is a RRC connection release during a GMM procedure. The wireless communication device 120 can initiate a packet call and initiate a service request procedure after the elements of the network 110 start a RRC connection release procedure. The wireless communication device 120 can then receive the RRC connection release during the service request procedure. The wireless communication device 120 can then retry the service request procedure substantially immediately.

This is analogous to a scenario where a RRC connection is present, a PS signaling connection is also present, and the wireless communication device 120 is in a GMM registered state, and a packet data protocol context is active when the network 110 starts releasing a PS signaling connection. When some uplink data needs to be sent for which there are no radio bearers (RBs), the wireless communication device 120 can initiate a service request procedure. The wireless communication device 120 can then receive the RRC connection release or a PS signaling connection release during the service request procedure. The wireless communication device 120 can retry the attach procedure substantially immediately. Thus, there can be a lesser chance of a packet call failure and a lesser chance of disturbance to packet data transfer.

As another related example, when there is possibility of a lower layer failure before a security mode control procedure is completed before a service accept or service reject message is received, it is not necessary to abort the procedure. In one case, when there is a possible lower layer failure before a service request procedure is completed because there is a release of a PS signaling connection before completion of a service request procedure, the service request procedure can be retried. This can occur when the service request was initiated over an existing PS signaling connection, when no NAS message on the PS signaling connection was received after the service request was sent out, and/or when the PS security procedure was not initiated after the service request was sent out. In another case, when there is a RRC connection release with a cause of 'Normal' or 'User inactivity' before completion of a service request procedure, the service request procedure can be retried. This can occur when the service request was initiated over an existing RRC connection, when no NAS message on a PS signaling connection was received after the service request was sent out, and/or when a PS security procedure was not initiated after the service request was sent out. In another case, when there is a RRC connection release with a cause of 'Directed signaling connection reestablishment' before completion of a service request procedure a routing area update procedure initiation can be performed followed by retrying the service request procedure when the service request procedure is not due to retry of the service request procedure due to a 'Directed Signaling connection reestablishment' signal. This can help to prevent interruption to already active packet calls and prevent failure of packet call establishment.

According to another embodiment, communication device terminated CS call performance can be improved where a RRC connection is present and a CS signaling connection is not present. When the wireless communication device 120 starts a location update due to some timer expiry or due to a CM service reject message 'IMSI unknown in VLR' and the network 110 starts a RRC connection release procedure, the wireless communication device 120 may receive a RRC connection release during a location update procedure. The wireless communication device 120 can retry the location update immediately. This can reduce the chance of missed calls.

For example, when a RRC release is received before the normal end of the procedure, when the release is based on causes such as 'Normal,' 'User inactivity,' and/or 'Directed Signaling connection Reestablishment' before the completion of the location update procedure the wireless communication device 120 can retry the location update procedure. This can happen when the location update was initiated over an existing RRC connection, when no NAS message on the CS signaling connection was received after the location update request was sent out, and/or when a CS security procedure was not initiated after the location update request was sent out. Thus, the wireless communication device 120 does not have to consider RRC connection release as lower layer failure. Therefore, delays in the location update procedure can be reduced and chances of missing a call are reduced.

According to another embodiment, a PS detach procedure can be improved when a RRC connection is present and a PS signaling connection is not present. A subscriber identity module (SIM) card can be removed or a GPRS context can be disabled in the wireless communication device 120 after the network 110 starts a RRC connection release procedure. The wireless communication device 120 can receive a RRC connection release after initiating a GPRS detach procedure. The wireless communication device 120 can retry the GPRS detach procedure immediately, which can reduce overhead on the network side. Similarly, a PS signaling connection release can be improved when a RRC connection is present and a PS signaling connection is also present. A SIM card can be removed or a GPRS context can be disabled in the wireless communication device 120 after the network 110 starts releasing a PS signaling connection. The wireless communication device 120 can initiate a GPRS detach procedure and then receive a PS signaling connection release or a RRC connection release during the detach procedure. The wireless communication device 120 can retry the GPRS detach procedure immediately, which can reduce overhead on the network side.

For example, when the wireless communication device 120 receives a release of a PS signaling connection before reception a detach accept signal, the wireless communication device 120 can retry the detach procedure. This can occur when the detach was initiated over an existing PS signaling connection, when no NAS message on a PS signaling connection was received after the detach request was sent out, and/or when a PS security procedure was not initiated after the detach request was sent out. As another example, when the wireless communication device 120 receives a RRC connection release with a cause of 'Normal' or 'User inactivity' before completion of a detach procedure, the wireless communication device 120 can retry the detach procedure. This can happen when the detach was initiated over an existing RRC connection, when no NAS message on the PS signaling connection was received after the detach request was sent out, and/or when a PS security procedure was not initiated after the detach request was sent out. As another example, when the wireless communication device 120 receives a RRC connection release with a cause such as 'directed signaling connection reestablishment' before completion of a detach procedure, it is not necessary to perform a routing area update procedure initiation followed by detach procedure completion. This can occur when the detach is not due to SIM removal and/or when the detach procedure is not due to retry of detach procedure due to 'Directed Signaling connection reestablishment.' This can reduce missed detach request messages.

According to another embodiment, a routing area update procedure can be improved when a lower layer failure occurs before a routing area accept message or a routing area update message is received. For example, the wireless communication device 120 may receive a release of a PS signaling connection before completion of the routing area update procedure and immediately retry the routing area update procedure. This can occur when the routing area update was initiated over an existing PS signaling connection, when the routing area update was not due to a T3330 timer expiry, when no NAS message on a PS signaling connection was received after the routing area update request was sent out, and/or when a PS security procedure was not initiated after the routing area update request was sent out. According to a similar embodiment, when a RRC connection release is received with a cause of 'Normal,' 'User inactivity,' or 'Directed Signaling Connection Reestablishment' before completion of the routing area update procedure, the wireless communication device 120 can retry the routing area update procedure. This can occur when the routing area update was initiated over an existing RRC connection, when the routing area update was not due to a T3330 timer expiration, when no NAS message on a PS signaling connection was received after the routing area update request was sent out, and/or when a PS security procedure was not initiated after the routing area update request was sent out. This can reduce the time for a routing area update procedure.

Thus, the teachings of the present disclosure can overcome problems that occur due to collisions between multiple transactions. Also, the teachings of the present disclosure can relate to the establishment of radio resource control connections that are being used for activities that are related, such as in the same domain, and that are being used for activities that are unrelated, such as in the circuit switched and the packet switched domains. Furthermore, the teachings of the present disclosure can improve the interaction of a wireless communication device moving between different coverage areas because it can enable procedures, such as handover, to work more efficiently. The teachings of the present disclosure additionally provide for improved user experience because procedures can be completed more successfully and quicker. The teachings of the present disclosure can also improve network statistics because it can reduce the number of failures due to radio resource control connection failures. The teachings of the present disclosure can further improve power saving in a communication device because procedures do not have to be re-run.

The method of this disclosure is preferably implemented on a programmed processor. However, the controllers, the flowcharts, and the methods of the signal diagrams may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowchart and signal diagrams shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

What is claimed is:

1. A method in a universal mobile telecommunication system, the method comprising:
    initiating at least one of a circuit switched signaling connection initiation procedure and a general packet radio service mobility management procedure over an existing radio resource control connection on a universal mobile telecommunication system;
    receiving a radio resource control connection release signal after initiating the procedure and prior to receiving a response to the procedure from a core network including at least one of a circuit switched core network and a packet switched core network; and
    retrying the procedure substantially immediately on the existing radio resource control connection on a universal mobile telecommunication system, wherein the core network includes at least one of a mobile switching center and a serving general packet radio service support node.

2. A method in a universal mobile telecommunication system, the method comprising:
    initiating at least one of a circuit switched signaling connection initiation procedure and a general packet radio service mobility management procedure over an existing radio resource control connection on a universal mobile telecommunication system;
    receiving a radio resource control connection release signal after initiating the procedure and prior to receiving a response to the procedure from a core network including at least one of a circuit switched core network and a packet switched core network; and
    retrying the procedure substantially immediately without designating the initiation of the procedure as a failure on the existing radio resource control connection on a universal mobile telecommunication system, wherein the core network includes at least one of a mobile switching center and a serving general packet radio service support node.

3. The method according to claim 1, wherein retrying further comprises retrying the procedure substantially immediately without aborting the procedure.

4. The method according to claim 1, wherein retrying further comprises retrying the procedure substantially immediately without waiting a designated wait period.

5. The method according to claim 1, wherein retrying the procedure includes performing cell selection after receiving the connection release signal.

6. The method according to claim 5, wherein retrying the procedure includes sending a radio resource control connection request after performing cell selection.

7. The method according to claim 1, wherein initiating further comprises initiating a procedure over an existing connection on a universal mobile telecommunication system by sending a request to a universal mobile telecommunication system terrestrial radio access network.

8. The method according to claim 1, wherein initiating further comprises initiating a general packet radio service mobility management procedure over an existing packet switched connection on a universal mobile telecommunication system.

9. The method according to claim 8, wherein receiving further comprises receiving a radio resource control connection release signal prior to receiving a response from a packet switched core network.

10. The method according to claim 8, wherein receiving further comprises receiving a packet switched connection release signal prior to receiving a response from a packet switched core network regarding the general packet radio service mobility management procedure.

11. A method in a universal mobile telecommunication system, the method comprising:
    initiating a procedure over an existing radio resource control connection on a universal mobile telecommunication system;
    receiving a connection release signal after initiating the procedure and prior to receiving a response to the initiated procedure from a core network; and
    retrying the procedure substantially immediately on the existing radio resource control connection on a universal mobile telecommunication system without designating the initiation of the procedure as a failure, wherein the core network includes one of a mobile switching center and a serving general packet radio service support node.

* * * * *